UNITED STATES PATENT OFFICE.

WILHELM MICHAELIS, OF BERLIN, GERMANY, ASSIGNOR TO FRIED. KRUPP, GRUSONWERK AT MAGDEBURG-BUCKAU, GERMANY, A FIRM.

MANUFACTURE OF HYDRAULIC CEMENT.

No. 806,161.          Specification of Letters Patent.          Patented Dec. 5, 1905.

Application filed March 28, 1901. Serial No. 53,330.

*To all whom it may concern:*

Be it known that I, WILHELM MICHAELIS, doctor of philosophy, cement expert, a subject of the King of Prussia, German Emperor, residing at 19 Friedenstrasse, in the city of Berlin, Empire of Germany, have invented a certain new and useful Improved Manufacture of Hydraulic Cement, of which the following is a specification.

As is known, Portland cement owing to its high content of lime and alumina cannot resist the chemical action of sea-water.

This invention relates to the manufacture of a cement which is fully resistant to sea-water while having all the properties of ordinary Portland cement.

Prolonged investigation has shown that calcium ferrate and calcium manganate are not changed by the sulfates in sea-water and that there is no formation of crystalline double compounds of calcium ferrate or manganate with calcium sulfate attended by increase of volume in consequence of chemical combination with water, (formation of polyhydrate.)

That a cement may resist the chemical action of sea-water its content of alumina must be diminished as much as possible, if not reduced to *nil*. For this purpose iron ores— such as brown hematite, spathic iron ore, calcareous and silicic ironstone, bog-iron ore, or manganiferous iron ore—is used instead of aluminium silicate—that is, clay.

In the manufacture of the new cement limestone, calcareous marl, chalk, or burnt lime is intimately mixed with oxid ores of the heavy metals of the iron group—such as iron, manganese, or chromium—or with by-products from the preparation of such ores, or with puddling-furnace slag or finery-slag, silica being added, if necessary. This mixture is burned at a sintering temperature at least and is then finely ground. The iron or manganese cement is essentially more easily sintered than Portland-cement mixture and has a chocolate-brown color. Chromium cement, which is more difficult to sinter, has a green color. The specific gravity of these ore cements is higher than that of Portland cement. Setting and initial hardening proceed more slowly than in the case of Portland cement; but the new cement after seven days' hardening under water attains a high degree of solidity, surpassing Portland cement in this respect.

The new cement resists fully the action of sea-water, as well as that of calcium or magnesium sulfate. The unburnt cement may be added to unburnt Portland cement in any desired proportions, so that by burning such mixtures an unbroken series extending from Portland cement rich in calcium aluminate to ore cement can be produced. The burnt cement may also be mixed with Portland cement in any desired proportion. The manufacture on a large scale is quite the same as for Portland cement. All the arrangements of existing works lend themselves for the production of ore cement. The cost of manufacture is smaller than that for Portland cement, as the calcareous material, except marls containing clay, which are inadmissible, are the same, and the iron ore is cheap and abundant. Moreover, certain by-products, such as burnt pyrites or chrome-ore waste, may be used with economy. Finally, the consumption of fuel is smaller than for Portland cement, because the ore cement sinters and fuses at a lower temperature.

I am aware of experiments having been carried on for replacing alumina in ordinary cement by other metals by the mixing and heating together of the comparatively pure constituents; but this process, aside from being impracticable and too expensive for manufacturing purposes on a large scale, fails to yield under all circumstances a cement which, besides having all the valuable properties of ordinary cement, is superior to it in that respect that it will withstand the action of sea-water.

I am also aware of oxids of iron, of manganese, and of chromium and ores and ore residues, such as slags, having heretofore been mixed with already-prepared cement mixtures; but as heretofore prepared such mixtures contained alumina as an essential constituent, and as a general rule the oxid of iron and of other metals of this group was contained therein chiefly as a lower oxid and the mixtures were merely calcined in such a manner that no intimate reaction between the constituents was induced, as it is the case in the manufacture of Portland cement, for which my invention is intended to provide a substitute to be used for all purposes where ordinary Portland cement is excluded.

What I claim, and desire to secure by Letters Patent of the United States, is—

1. The process for manufacturing a hydraulic cement which consists in preparing a mixture of ores and ore residues of peroxids of heavy metals of the iron group practically free from alumina with silica and lime and submitting the mixture to burning and sintering the same to incipient fusion, in the presence of air and finally grinding the resultant product.

2. The process of manufacturing a hydraulic cement which consists in mixing ores of peroxids of any of the heavy metals of the iron group practically free from alumina with lime and silica, adding this mixture in any state or condition to a suitable quantity of ordinary Portland-cement mixture in any state or condition, substantially as described.

3. The process of manufacturing a hydraulic cement which consists in submitting mixtures of ores of peroxids of any of the heavy metals of the iron group practically free from alumina with lime and silica and of ordinary Portland-cement mixtures to the action of a sintering temperature and to incipient fusion and comminuting and subdividing the particles of the mixture, substantially as described.

4. The process for manufacturing a hydraulic cement with heavy metals as a base which consists in comminuting and mixing silicious peroxidic ores of heavy metals of the iron group and limestone and burning the mixture to incipient fusion and with the exclusion of reducing agents in the presence of air.

5. The process for manufacturing a hydraulic cement with heavy metals as a base which consists in disintegrating and intimately mixing together peroxid containing ores of the heavy metals of the iron group and silicious limestone, sintering or burning the mixture to incipient fusion and with the exclusion of reducing agents and grinding the burnt product.

6. The process for manufacturing a hydraulic cement with heavy metals as a base which consists in comminuting and mixing silicious ores of peroxids of the heavy metals of the iron group and limestone and burning the mixture to incipient fusion and with the exclusion of reducing agents in the presence of air, and clinkering and grinding the resultant product.

7. The process for manufacturing a hydraulic cement with heavy metals as a base which consists in comminuting and mixing silicious ores of peroxids of heavy metals of the iron group and ore residues practically free from alumina with lime and silica, burning the mixture to incipient fusion and in the presence of an excess of air, grinding the product and mixing the same with ordinary cement mixtures in any form or condition.

8. The process for manufacturing a hydraulic cement with heavy metals as a base which consists in comminuting and mixing silicious peroxids containing ores of heavy metals of the iron group and ore residues practically free from alumina with silicious lime, burning the mixture to incipient fusion and in the presence of an excess of air, grinding the product and mixing the same with ordinary cement mixtures in any form or condition.

In witness whereof I have hereunto signed my name in the presence of two subscribing witnesses.

WILHELM MICHAELIS.

Witnesses:
   WOLDEMAR HAUPT,
   HENRY HASPER.